United States Patent [19]

Martinino et al.

[11] Patent Number: 4,894,841
[45] Date of Patent: Jan. 16, 1990

[54] DIGITAL DIRECT-SEQUENCE SPREAD-SPECTRUM MODEM

[75] Inventors: Francesco Martinino, Campobasso; Andrea Pugnaloni; Maurizio Tripodi, both of Rome, all of Italy

[73] Assignee: Selenia Spazio S.P.A., L'Aquila, Italy

[21] Appl. No.: 210,725

[22] Filed: Jun. 23, 1988

[30] Foreign Application Priority Data

Jun. 26, 1987 [IT] Italy .................. 48114 A/87

[51] Int. Cl.⁴ ............................................. H04L 9/00
[52] U.S. Cl. ........................................................ 375/1
[58] Field of Search ............................ 375/1; 380/34

[56] References Cited

U.S. PATENT DOCUMENTS

| Re. 32,905 | 4/1989 | Baran | 375/1 |
| 4,455,651 | 6/1984 | Baran | 375/1 |
| 4,607,375 | 8/1986 | Lee | 375/1 |

OTHER PUBLICATIONS

Alta Frequenza, Dec. 1988, AEI, vol. LVII-N 10, International Journal in Telecommunications and Related Technologies Focus on Satellite Communication, From R & D Laboratories, A Low Bit Rate Spread Spectrum Modem for Satellite Communications, pp. 591–601–Italy.

Primary Examiner—Salvatore Cangialosi
Attorney, Agent, or Firm—Herbert Dubno

[57] ABSTRACT

A direct-sequence digital spread spectrum modem in which the given functions are implemented by software algorithms utilizing a microprocessor architecture. The modem is especially effective for telesurveillance, teledetection, telemonitoring, telecontrol and telecommunications generally.

11 Claims, 5 Drawing Sheets

DIGITAL DIRECT-SEQUENCE SPREAD-SPECTRUM MODEM

FIELD OF THE INVENTION

Our present invention relates to a digital, direct-sequence spread-spectrum modem and, more particularly, to a spread-spectrum modem whose key functions are implemented by an algorithm in digital form in a microprocessor architecture or topology. The invention specifically relates to modems for use in the telecommunications field and for a variety of telecommunication purposes.

BACKGROUND OF THE INVENTION

Modems are widely used in telecommunications for communication between systems, e.g. for satellite communications and for telecommunications generally.

In the past, all of the main indications involved in transmission and reception have been carried out using analog or a combination of digital and analog techniques, particularly with respect to carrier-recovery functions.

With the development of domestic satellite telecommunication systems, especially for teledetection, low-bitrate commercial services, telemonitoring, telecontrol and multichannel signalling, for which spread-spectrum transmission is particularly well suited when the satellite access protocol is of the code-division multiple access (CDMA) type, spread-spectrum modems have had to be developed for civilian purposes. In developing such modems for such telecommunication purposes, however, the modems have retained their essentially analog topology.

In particular, the main code-carrier recovery functions were achieved at intermediate frequency levels utilizing analog devices. Both the main code recovery and the carrier-recovery operation were performed at such intermediate frequencies with the analog devices which had been found to be suitable for such modems prior to their increased use in telecommunications for civil purposes.

The analog approach for main code recovery and for carrier recovery, however, requires very complex circuitry which could not be tightly packaged and also had high power consumption and cost. The flexibility of the system was limited and generally it was difficult to interface such modems with high intelligence systems or high echelon processes or use such modems to interface with higher echelon processes and more intelligent telecommunication devices and systems.

OBJECT OF THE INVENTION

It is the principal object of the present invention to provide a digital, direct-sequence, spread-spectrum modem which is particularly useful for civilian telecommunications purposes, especially those described previously and are of low cost, high versatility and low power consumption, while being compact and flexible in programmability.

SUMMARY OF THE INVENTION

These objects and others which will become apparent hereinafter are attained, in accordance with the invention in a modem which is essentially a digital circuit arrangement in both its transmitting and receiving sections, which utilizes a microprocessor topology and is software programmable for at least the command algorithm, thereby affording maximum flexibility.

In particular, the digital direct-sequence spread-spectrum modem of the invention comprises:

a transmitting section having an information input and a transmitted-signal output and, between the information input and the transmitted-signal output, in sequence:

a base band transmitter including a base band code generator for translation of an input data sequence generated by an external source connected to the information input into a coded signal sequence to be transmitted, a BPSK modulator connected to the base band transmitter for digital BPSK modulation of the coded signal sequence to be transmitted, and a frequency shifter connected to the BPSK modulator for shifting the BPSK modulated coded signal sequence to be transmitted from a carrier frequency to a standard intermediate frequency; and a receiving section having a received-signal input and an information output and, between the received-signal input and the information output, in sequence;

a frequency shifter connected to the received signal input for shifting a standard intermediate frequency of a received signal to a carrier frequency for spread spectrum operation, a BPSK data-aided demodulator connected to the frequency shifter of the receiving section for demodulating the received signal to a BPSK standard, and a base-band processor connected to the BPSK data-aided demodulator for extracting a data sequence from the demodulated received signal and delivering the data sequence to the information output.

According to a feature of this invention, the transmitting and receiving sections are provided with means whereby carrier code and clock recovery and at least some data extraction correlation operations are carried out wholly digitally under the control of the command algorithm which is programmed in the circuitry utilizing the aforementioned microprocessor techniques.

The sections can include dedicated circuitry for a code recovery, a clock recovery and a carrier-recovery algorithm.

According to a further feature of the invention, the transmitting and receiving sections include phase-locked loop (PPL) circuits for instantaneous carrier-phase control and controlled by a digital-circuit microprocessor in response to a modem-controlled algorithm.

The sections can include circuitry completely programmable by software (S/W) without circuit modification, as to bitrate and code length. The circuitry of the two sections can be configured for all point multipoint data diffusion, telesurveillance, teledetection, mobile telecommunications, highly interference-free transmission systems, telecommunications with COM A access to satellite and low-speed communications.

Specifically, the base-band transmitter can comprise:
a code generator;
means providing a code length selection input connected to the code generator;
means providing a code repetition period selection input connected to the code generator; and
an exclusive - OR gate having as one input, the information input of the transmission section, as a second input an output from the code generator, and an output connected to an input of the BPSK modulator.

The BPSK modulator can include a bandpass filter.

Advantageously, the frequency shifter of the transmitting section includes:
a local oscillator; and
a mixer having one input connected to the BPSK modulator, a second input connected to the local oscillator, and an output forming the transmitted-signal output of the transmitting section.

The frequency shifter of the receiving section can include:
a local oscillator; and
a mixer having one input constituted by the received-signal input, a second input from the local oscillator, and an output connected to the BPSK data-aided demodulator.

In the receiving section, moreover, the BPSK data-aided demodulator can comprise:
a local oscillator; and
a mixer having one input connected to said BPSK modulator, a second input connected to said local oscillator, and an output forming the transmitted-signal output of said transmitting section.

The data-aided demodulator can comprise:
a bandpass filter receiving an input from the frequency shifter of the receiving section;
a first and a second mixer each having one input connected to an output of the bandpass filter, the first mixer receiving a reconstructed carrier at a second input thereof and the second mixer receiving the reconstructed carrier through a 90° phase shifter at a second input of the second mixer;
respective lowpass filters connected to outputs of the mixers; and
respective Schmitt triggers connected to outputs of the lowpass filters.

In the latter case, the bandpass processor can include:
respective correlators connected to the Schmitt triggers;
a code input connected to the correlators; and
a carrier recovery logic receiving inputs from the correlators and generating the reconstructed carrier.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
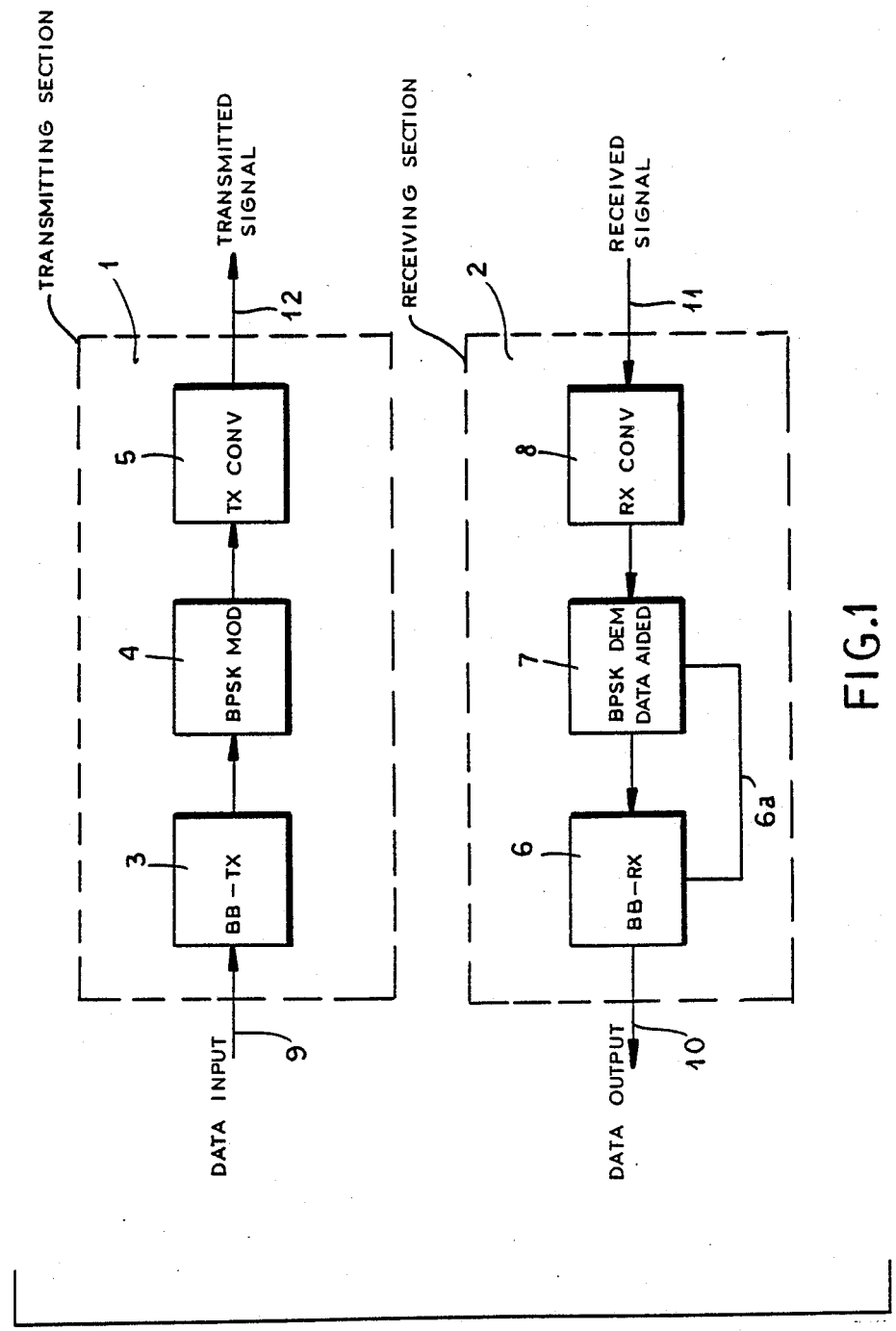
FIG. 1 is a block diagram illustrating the modem of the present invention.

FIG. 1 shows the two basic components of a spread spectrum direct-sequence digital modem in accordance with the present invention. The two main components, of course, are the transmitting section 1 which receives the data input at 9 and outputs a transmitted signal at 12. The second component is the receiving section 2 which has a received signal input at 11 and outputs a data signal at 10.

Figure 2:
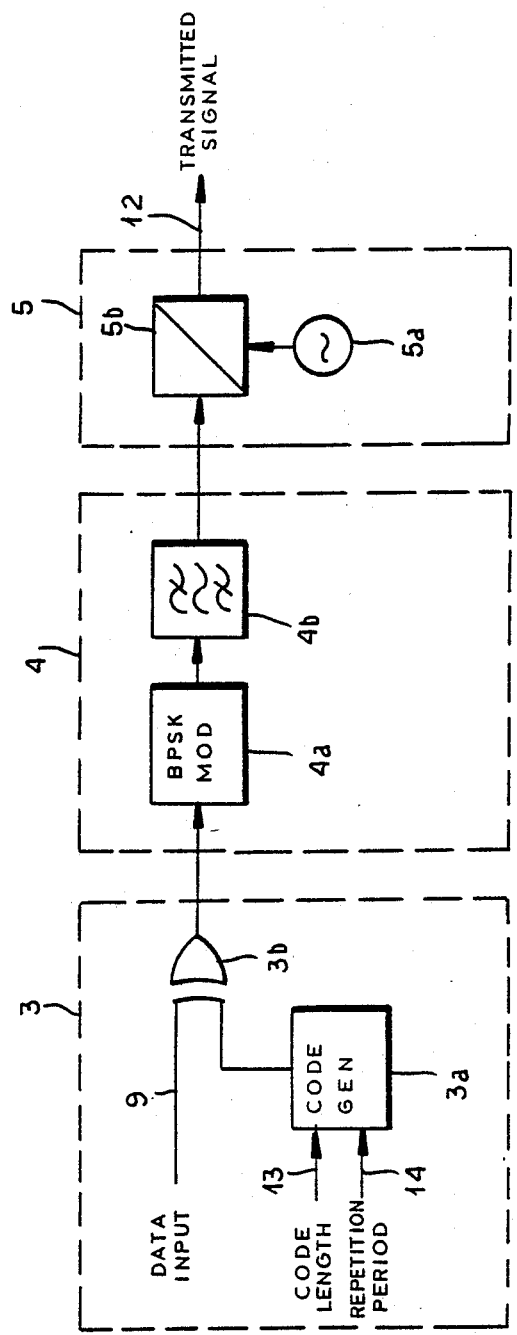
FIG. 2 is a block diagram of a detail of the modem shown in FIG. 1, illustrating more specifically the circuit elements of the transmitting section.
Figure 3:
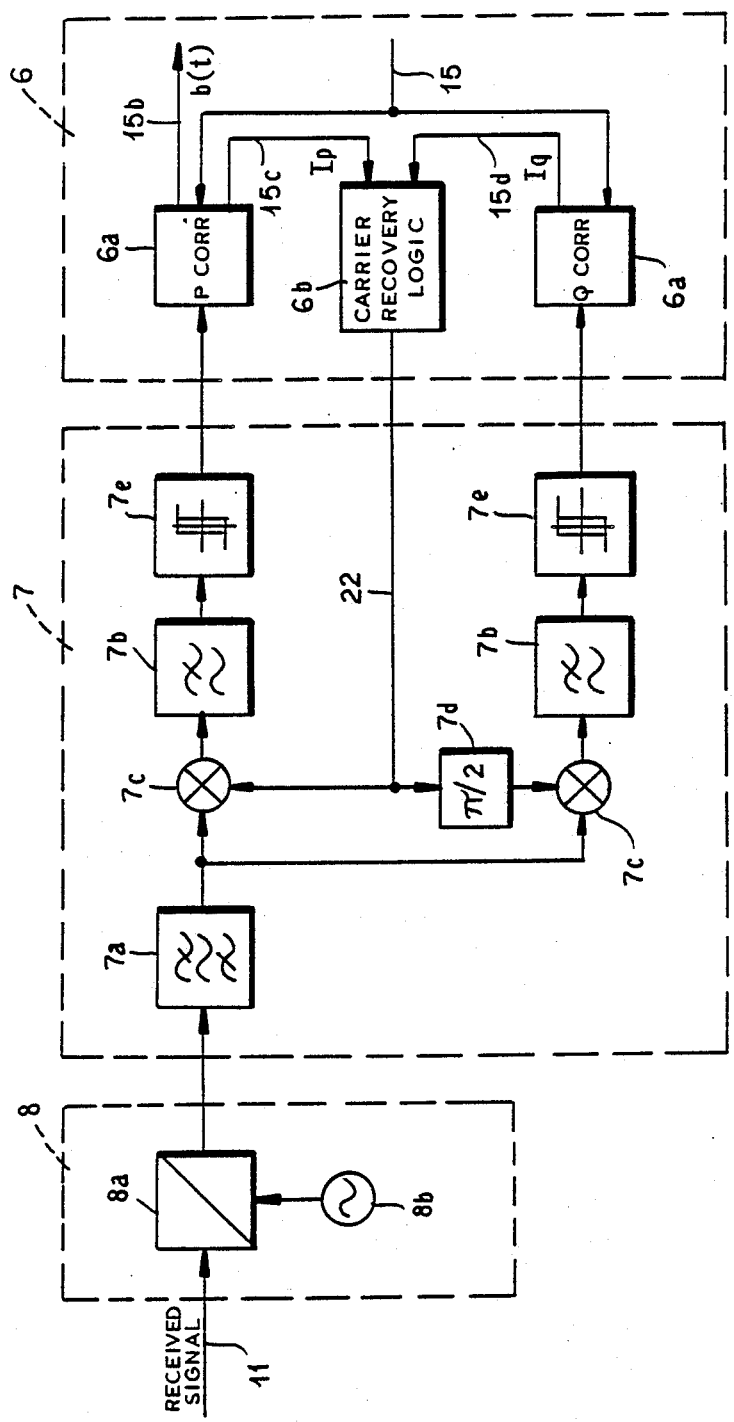
FIG. 3 is a block diagram of the receiving section of the modem in greater detail.

FIG. 2 shows the components of the transmitting section in greater detail, while FIG. 3 shows the components of the receiving signal in greater detail.

As can be seen from FIG. 1, the basic elements of the transmitting section 1 include a bandpass transmitter 3 which receives the data input 9 and is connected, in turn, to a BPSK modulator 4. The output of the latter is supplied to a transmitter frequency converter 5 whose output 12 delivers the transmitted signal to the communication line or link.

Correspondingly, the receiving section 2 comprises a frequency converter 8 for the received signal delivered at 11, a data-aided BPSK demodulator 78 connected to the frequency converter 8, a base-band receiver 6 connected to the BPSK demodulator 7 and having a feedback path 6a thereto.

The base-band receiver 6 is provided with a data output 10 to the control terminal or peripheral which is in communication with the remainder of the communication network.

Essentially, therefore, the bandpass transmitter 3 provides for the translation of the input data sequence generated by an external source into the sequence to be transmitted while the BPSK modulator performs digital BPSK modulation of the translated input data sequence in the form of the transmitted sequence generated by the VBB-TX3.

The transmission-frequency converter 5 (TX CONV) shifts the signal from the carrier frequency to the standard intermediate frequency.

Conversely in the receiving section 2, the frequency converter 8 (RX CONV) shifts the standard intermediate frequency of the incoming or received signal at 11 to the carrier frequency.

The BPSK data-aided demodulator 7 digitally demodulates the signal from the frequency converter 8 to the BPSK standard with carrier recovery being performed by means of the additional information coming from the receiver 6 (BB-RX) and particularly the BB-RX module correctors as will be described below to output a data signal at 10.

FIG. 2 shows the modules of the transmitting section 2 in greater detail. In particular, it can be seen that the data input is applied at 9 to one input of exclusive OR gate 3b, another input of which derives from a code generator 3a. The output from the exclusive OR logic gate is delivered to the BPSK modulator module 4. The code generator 3a has a repetition period input 14 as well as a code length input 13.

The module 4 comprises the BPSK modulator circuit 4a itself as well as a bandpass filter 4b while the module 5, i.e. the transmitter frequency converter comprises a local oscillator 5a feeding a mixer 5b, another input of which derives from the bandpass filter 4b. The mixer 5b outputs the transmitted signal 12. Consequently, the code generator can provide an output which is selectable in terms of width and repetition frequency as long as the product of big frequency code length is not greater than the maximum frequency which can be processed by the receiving section.

The code is of module two as determined by the exclusive - OR logic 3b, thereby obtaining a spread factor which is proportional to code length.

The signal is then BPSK modulated at 4a and filtered at 4b for the main lobe. The spectrum generated is subjected to a frequency shift by mixer 5b and local oscillator 5a to obtain a standard intermediate frequency at the output 12.

The receiving section shown in greater detail in FIG. 3 applies the modulated signal input or received signal 11 in module 8 to a mixer 8a receiving another input from a local oscillator 8b.

In the data-aided BPSK demodulator, the signal from mixer 8a is applied to a bandpass filter 7a whose output is applied simultaneously to two mixers 7c. One of these mixers receives an output from the carrier recovery logic 6b which can be microprocessor controlled, via line 22, the same signal, in quadrature being delivered by a 90° phase shifter 7d to the other mixer 7c. The outputs of the two mixers are applied through respective lowpass filters 7b to Schmitt triggers 7e.

The bandpass receiver module 6 comprises respective correlators 6a, identified as a P correlator (P CORR) and a Q correlator (Q CORR), the outputs of which are applied to the carrier recovery logic 6b. Additional inputs to these correlators are provided by the code input 15 and the output of the P correlator 6a has been indicated at 15b in FIG. 3.

The signal received at 11 is therefore frequency shifted by the standard IF to the carrier frequency by mixer 8a and local oscillator 8b.

The output signal following filter 7a is coherently demodulated into in-phase and quadrature components. In particular, the upper branch of the circuit in this FIG. extracts the in-phase component by multiplication of the regenerated carrier in the mixer 7c, filtering in the lowpass filter 7b and regeneration of the digital waveform in the Schmitt trigger of the upper branch at 7a.

The same operations are performed in the lower branch to extract the quadrature component.

The two signals thus obtained are correlated with the code from input 15 by the correlators 6a to reconstruct the source data sequence at output 15b. Signals Ip and Iq present on lines 15c and 15d serve to track the carrier.

Figure 4:
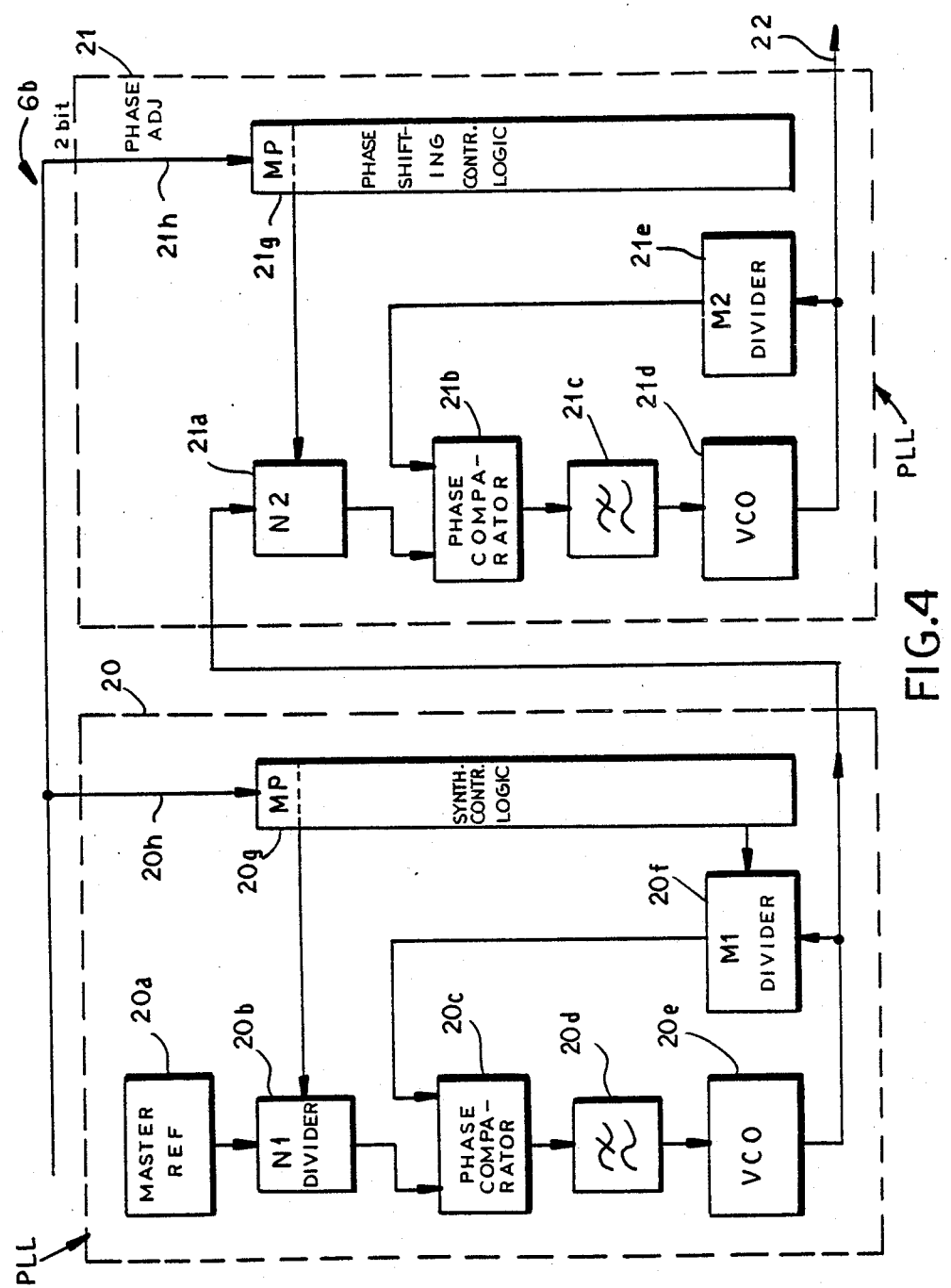
FIG. 4 is a block diagram of the carrier recovery logic circuit of FIG. 3.

The carrier recovery logic 6b is represented in FIG. 4 also in block diagram form. The two basic elements of this circuit are the phase-lock locked loops 20 and 21, sometimes referred to herein as PLL'Xs.

The PLL 20 serves for frequency synthesis and tuning and includes a reference oscillator 20b providing an input to a divider 20b which delivers its output to a phase comparator 20c. The output from the phase comparator is applied to a loop filter 20d which, in turn, provides an output to a voltage controlled oscillator (VCO) 20e.

The output of the VCO 20e is applied to a further divider 20f of the PLL 20 and to a divider 21e of the PLL 21. The output from the divider 20f forms a second input to the phase separator and the PLL 20 also includes a PLL synthesizer control logic 20g for phase regulation which can be programmed and has an input at 20h.

The PLL 21, in turn, comprises the divider 21a previously mentioned which outputs to a phase comparator 21b connected, in turn, to the loop filter 21c which provides an output to the voltage-controlled oscillator (VCO) 21d. The output from VCO 21d is the output 22 previously described in connection with FIG. 3 and feeding the mixers or multiplexers 7c, respectively, in-phase and in quadrature. This output is the output of the reconstructed carrier.

Phase locking of the loop is provided from the output of the VCO 21d through the divider 21e to the phase comparator 21b as a second input to the latter. The phase-shifting control logic is represented at 21g.

It will thus be apparent that the carrier tracker consists of two cascaded PLLs, one to correct frequency, (PLL 20) and the other to correct phase (PLL 21), ultimately delivering the reconstructed carrier output on line 22.

Both operations are performed by the microprocessor, e.g. through inputs at 20h and 21h and the logics 20g and 21g can have respective microprocessors built in for performance or can be provided with a separate microprocessor controller which is illustrated simply for convenience at MP in FIG. 4.

Figure 5:
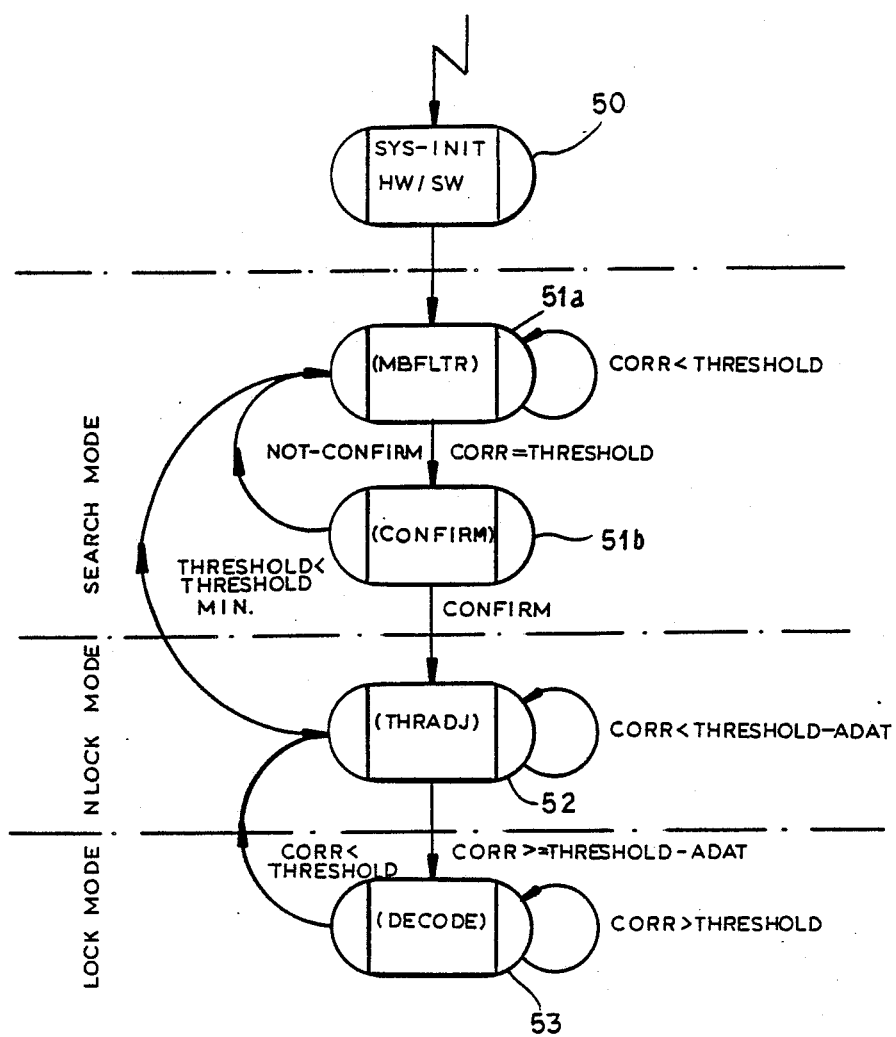
FIG. 5 is a diagram of a control algorithm.

It should be clear, therefore, that a distinguishing feature of the invention is that the carrier code and clock recovery problems are solved by the use of numerically processed algorithms in the low band. A typical algorithm of this type has been illustrated diagrammatically in FIG. 5 with respect to the algorithm for the receiving section. Essentially the algorithm represents a sequential machine which provides an initializing step 50 followed by a sequence of steps represented as blocks.

Blocks 51a and 51b represent the code synchronism search. Block 52 represents an adaptive adjustment of the code detection threshold. Block 53 represents data decoding.

The algorithm thus performs the following functions:
(a) an initial code and carrier search by the matched filter;
(b) syncronization and lock-onto data code and carrier code;
(c) adaptive adjustment of the code-detection threshold; and
(d) data decoding.

Thus following initialization, the algorithm effects entry of the code synchronization search phase in which the required synchronization is carried out by means of successive correlations based upon the matched filter and checkout procedures of effective lock-on. Once code lock-on has taken place, local carrier frequency and phase adjustments are made based upon successive applications of the error function $$Er = Cq/Cp$$

where Cp stands for the in-phase branch correlation factor and Cq is the correlation factor for the quadrature branch and phase adjustment is accomplished using suitable prefixed absolute values while the adjustment sign is set by that of the function Er which is introduced beforehand.

Code lock-on is obtained initially even in the presence of large instantaneous phase errors by evaluating a correlation function of the type $$C = |Cp^2 + Cq^2|^{\frac{1}{2}}$$

which is independent of such instantaneous phase errors. Shifting to the next stage 52 takes place only when a lock-on configuration in block 51b ensures a steady code synchronization to a high probability.

In state 52, adaptive regulation of code-detection threshold takes place so as to detect in the short time the end of a transmission.

Finally in block 53, the sequence of data transmitted is decoded by analyzing the correlation between the memorized code and the received chip sequence.

We claim:

1. A digital direct-sequence spread-spectrum modem comprising:
   a transmitting section having an information input and a transmitted-signal output and, between said information input and said transmitted-signal output, in sequence:
   a base band transmitter including a base band code generator for translation of an input data sequence generated by an external source connected to said information input into a coded signal sequence to be transmitted,
   a BPSK modulator connector to said base band transmitter for digital BPSK modulation of said coded signal sequence to be transmitted, and
   a frequency shifter connected to said BPSK modulator for shifting the BPSK modulated coded signal sequence to be transmitted from a carrier frequency to a standard intermediate frequency; and
   a receiving section having a received-signal input and an information output and, between said received-signal input and said information output, in sequence;
   a frequency shifter connected to said received signal input for shifting a standard intermediate frequency of a received signal to a carrier frequency for spread spectrum operation,
   a BPSK data-aided demodulator fully under microprocessor algorithm control connected to the frequency shifter of said receiving section for direct coherent demodulation of the received signal to a BPSK standard, and
   a base band processor connected to said BPSK data-aided demodulator for extracting a data sequence from the demodulated received signal and delivering said data sequence to said information output, said receiving section being provided with microprocesor means controlling carrier code recovery clock and data extraction correlation in accordance with microprocessor control algorithms wholly digitally.

2. The digital direct-sequence spread spectrum modem defined in claim 1 wherein said receiving section includes dedicated circuitry for a code recovery, a clock recovery and a carrier recovery algorithm.

3. The digital direct-sequence spread spectrum modem defined in claim 1 wherein said receiving section includes phase-locked loop circuits for instantaneous carrier phase control and controlled by a digital-circuit microprocessor in response to a modem-control algorithm.

4. The digital direct-sequence spread spectrum modem defined in claim 1 wherein said sections include circuitry completely programmable without circuit modification in terms of bitrate and code length.

5. The digital direct-sequence spread spectrum modem defined in claim 1 configured for all point multipoint data diffusion, telesurveillance, teledetection, mobile telecommunications, highly interference-free transmission systems, telecommunications with COM A access to satellite and low-speed telecommunications.

6. The digital direct-sequence spread spectrum modem defined in claim 1 wherein said base band transmitter comprises:
   a code generator;
   means providing a code length selection input connected to said code generator;
   means providing a code repetition period selection input connected to said code generator; and
   an exclusive - OR gate having as one input, the information input of the transmission section, as a second input an output from said code generator, and an output connected to an input of said BPSK modulator.

7. The digital direct-sequence spread spectrum modem defined in claim 6, wherein said BPSK modulator includes a bandpass filter.

8. The digital direct-sequence spread spectrum modem defined in claim 6 wherein said frequency shifter of said transmitting section includes:
   a local oscillator; and
   a mixer having one input connected to said BPSK modulator, a second input connected to said local oscillator, and an output forming the transmitted-signal output of said transmitting section.

9. The digital direct-sequence spread spectrum modem defined in claim 1 wherein said frequency shifter of said receiving section includes:
   a local oscillator; and
   a mixer having one input constituted by said received-signal input, a second input from said local oscillator, and an output connected to said BPSK data-aided demodulator.

10. The digital direct-sequence spread spectrum modem defined in claim 1 wherein said data-aided demodulator comprises:
    a bandpass filter receiving an input from the frequency shifter of the receiving section;
    a first and a second mixer each having one input connected to an output of said bandpass filter, said first mixer receiving a reconstructed carrier at a second input thereof and said second mixer receiving said reconstructed carrier through a 90° phase shifter at a second input of said second mixer;
    respective low-pass filters connected to outputs of the mixers; and
    respective Schmitt triggers connected to outputs of said low-pass filters 11. The digital direct-sequence spread spectrum modem defined in claim 10 wherein said base band processor includes:
    respective correlators connected to said Schmitt triggers;
    a code input connected to said correlators; and
    a carrier recovery logic receiving inputs from said correlators and generating said reconstructed carrier.

* * * * *